(12) United States Patent
Kim et al.

(10) Patent No.: US 11,926,241 B2
(45) Date of Patent: Mar. 12, 2024

(54) STRUCTURE FOR ATTACHMENT/DETACHMENT OF ENERGY PACK FOR ELECTRIC VEHICLE

(71) Applicant: MYONGJI UNIVERSITY INDUSTRY AND ACADEMIA COOPERATION FOUNDATION, Yongin-si (KR)

(72) Inventors: Minjae Kim, Yongin-si (KR); Jongmyung Kim, Yongin-si (KR); Giyeon Hwang, Incheon (KR); Huy Huu Nguyen, Yongin-si (KR); Yeongha Hwang, Yongin-si (KR)

( * ) Notice: Subject to any disclaimer, the term of this patent is extended or adjusted under 35 U.S.C. 154(b) by 134 days.

(21) Appl. No.: 17/607,898

(22) PCT Filed: Sep. 19, 2019

(86) PCT No.: PCT/KR2019/012155
§ 371 (c)(1),
(2) Date: Nov. 1, 2021

(87) PCT Pub. No.: WO2020/222370
PCT Pub. Date: Nov. 5, 2020

(65) Prior Publication Data
US 2022/0289066 A1  Sep. 15, 2022

(30) Foreign Application Priority Data
May 2, 2019 (KR) .................. 10-2019-0051484

(51) Int. Cl.
*B60L 53/80* (2019.01)
*B60L 50/64* (2019.01)
(Continued)

(52) U.S. Cl.
CPC ............... *B60L 53/80* (2019.02); *B60L 50/64* (2019.02); *H01M 8/2475* (2013.01);
(Continued)

(58) Field of Classification Search
CPC ...... B60L 53/80; B60L 50/64; H01M 50/249; H01M 8/2475; H01M 2220/20; H01M 2250/20
See application file for complete search history.

(56) References Cited

U.S. PATENT DOCUMENTS

| 2010/0114762 | A1 | 5/2010 | Ishii | |
| 2013/0025950 | A1* | 1/2013 | Brandon | B60K 1/04 180/65.1 |
| 2017/0232859 | A1 | 8/2017 | Li | |

FOREIGN PATENT DOCUMENTS

| CN | 204472591 U | 7/2015 |
| CN | 108583261 A | 9/2018 |

(Continued)

OTHER PUBLICATIONS

International Search Report for PCT/KR2019/012155 dated Jan. 30, 2021.

(Continued)

*Primary Examiner* — James A Shriver, II
*Assistant Examiner* — Nicholas R. Kandas

(57) ABSTRACT

The present invention relates to a structure for attachment/detachment of an energy pack for an electric vehicle and, more specifically, a structure for attachment/detachment of an energy pack for an electric vehicle, wherein: the energy capacity of a main energy supply device is reduced, and thereby fuel economy/efficiency can be increased through weight reduction; and an energy pack capable of additional energy supply is separately provided and detachably attached inside the vehicle depending on the travel distance of the vehicle, and thereby the driving conditions of the electric vehicle can be optimized without a need to change driving qualifications.

9 Claims, 8 Drawing Sheets

(51) Int. Cl.
*H01M 8/2475* (2016.01)
*H01M 50/249* (2021.01)

(52) U.S. Cl.
CPC ...... *H01M 50/249* (2021.01); *H01M 2220/20* (2013.01); *H01M 2250/20* (2013.01)

(56) References Cited

FOREIGN PATENT DOCUMENTS

| | | | |
|---|---|---|---|
| JP | 2582085 | Y2 * | 11/1991 |
| JP | H0546527 | U | 6/1993 |
| JP | 2582085 | Y2 * | 9/1998 |
| JP | P2004-304950 | A | 10/2004 |
| JP | P2013-69691 | A | 4/2013 |
| JP | P2017-536276 | A | 12/2017 |
| KR | 10-2013-0073309 | A | 7/2013 |
| WO | 2015/063599 | A2 | 5/2015 |

OTHER PUBLICATIONS

Le, Huan et al., Research on Energy Generation of Fuel-cell Vehicle, KSAE 2018 Annual Autumn Conference and Exhibition, Nov. 14, 2018-Nov. 17, 2018, p. 1201-1201(1 page), KSAE(The Korean Society of Automotive Engineers), Republic of Korea.

Nguyen, Huy Huu et al., Research on Energy Generation of Hybrid Electric Vehicle, KSAE 2018 Annual Autumn Conference and Exhibition, Nov. 14, 2018-Nov. 17, 2018, p. 1202-1202(1 page), KSAE(The Korean Society of Automotive Engineers), Republic of Korea.

* cited by examiner

STRUCTURE FOR ATTACHMENT/DETACHMENT OF ENERGY PACK FOR ELECTRIC VEHICLE

TECHNICAL FIELD

The present disclosure relates to a structure for attachment/detachment of an energy pack for an electric vehicle. More particularly, the present disclosure relates to a structure for attachment/detachment of an energy pack for an electric vehicle, the structure being capable of improving fuel efficiency of the vehicle by being configured with the energy pack that can be selectively attached to or detached from an inside of the vehicle, and the structure being also configured not to change a driving environment during long distance driving and parking.

BACKGROUND ART

In general, a vehicle, which is essential to human life and social activity, is a moving means that moves by using fossil energy such as oil.

However, the fossil energy is a finite resource and is thus becoming depleted over time, and the price thereof is constantly rising.

In particular, the fossil energy emits various exhaust gases that pollute the environment in the process of use and a large quantity of carbon dioxide that is a main contributing factor to global warming. Thus, in order to reduce carbon dioxide emissions, a variety of research and development activities are being performed throughout all industries in various countries of the world. As an alternative, an electric vehicle that moves by using electricity as an energy source has been developed.

The electric vehicle that has been developed includes a pure electric vehicle (battery powered electric vehicle), a hybrid electric vehicle that uses an electric motor and an engine, a fuel cell electric vehicle, etc.

In addition, in order to expand the vitalization and dissemination of the electric vehicle, a charging infrastructure by which charging can be easily performed at any time and any place is essential, and thus a variety of research thereon is underway.

However, unlike a vehicle that uses oil (gasoline, diesel, etc.) or natural gas, the electric vehicle uses a battery that is used in a charging manner. Therefore, there are problems as follows.

First, since excessive time is required to charge the battery, there is a problem that efficiency of charging an energy source of the electric vehicle is lower than that of refueling of a general vehicle.

Further, while the battery of the electric vehicle is charged, an ordinary driver is away from a seat and performs personal business, so that there is a problem that waiting time of another driver who wants to charge a battery of an electric vehicle may be increased.

Second, a battery charging station infrastructure for the electric vehicle is significantly lower than that of a general vehicle gas station infrastructure, so that it is difficult to meet a need of charging the battery of the electric vehicle.

Of course, although a construction of battery charging stations is increasing, a cost of constructing the battery charging station is high, thereby having an economical problem that is required to be solved.

Third, since a large proportion of the electric vehicle weight is due to the battery, there is a problem that the fuel efficiency is reduced.

If long distance driving is a routine, the weight of the battery may be tolerated for energy capacity. However, in a case of the electric vehicle for commuting only or for short distance driving, there is a problem that the weight of the battery is unnecessarily large.

In order to solve these problems, there has been proposed a technology of an electric vehicle in which an additional battery is further provided and the additional battery is moved by towing.

As can be seen from FIG. 1, a trailer 2 is connected to a rear of an electric vehicle 1, and an additional battery is loaded on the trailer 2 so as to transport the additional battery.

Therefore, charging of a battery of the electric vehicle 1 is not constrained, so that there is an advantage that the fuel efficiency may be increased since the weight of the vehicle body is reduced because it is possible to attach/detach the trailer 2.

However, the document of the related art described above has a problem as follows.

A method of towing the additional battery by using the trailer 2 requires driving skill, unlike a normal driving, and is subject to a lot of restrictions when parking.

That is, this method can be used for a specific place, for example, a camping place, and is not suitable for a general road driving environment.

Particularly, in a case of a woman and an elderly driver, driving skill is required according to a changed driving environment. Further, there is a problem that a factor that reduces aesthetic sense of an exterior of a vehicle is provided.

DOCUMENT OF RELATED ART

Chinese Utility Model Publication No. CN204472591U

DISCLOSURE

Technical Problem

Accordingly, the present disclosure has been made keeping in mind the above problems occurring in the related art, and the present disclosure is intended to propose a structure for attachment/detachment of an energy pack for an electric vehicle, the structure being capable of increasing fuel efficiency by being provided with an energy pack for supplying additional energy and in which the energy pack is capable of being attached to or detached from an inside of the vehicle, and the structure being also configured to allow driving of the vehicle to be performed without changing aesthetic sense of the vehicle and driving environment.

Technical Solution

In order to achieve the above objective, according to one aspect of the present disclosure, there is provided a structure for attachment/detachment of an energy pack for an electric vehicle, in which a main energy supply device is mounted to provide electric power to a driving module for driving a vehicle, and in which a storage space has an entrance opened toward an outside of the electric vehicle and is formed inside the electric vehicle and electrodes are provided at a side wall of the storage space so as to be electrically conducted to the driving module, the structure including: a cartridge body entering and exiting the storage space through the entrance and configured to supply electric power to the driving module, and having a supply terminal configured to be in contact with the electrodes of the storage space; and a leg mounted on the cartridge body and configured to be rotated toward the cartridge body and the ground.

At this time, it is preferable that a guide protrusion may be formed on either one of opposite side surfaces of the cartridge body or inner side surfaces of the storage space, and a guide groove for guiding the guide protrusion may be formed on the other one.

At this time, it is preferable that the leg may have such a length that a position of the guide protrusion and a position of the guide groove match each other.

In addition, it is preferable that the leg may be provided on the cartridge body by a shaft, and a rotation of the leg may be performed by electric power of the cartridge body.

In addition, it is preferable that the leg may be provided on the cartridge body by a shaft so as to be freely rotated, and a locker may be provided on the cartridge body to restrain the free rotation of the leg.

In addition, an output port may be provided on the cartridge body to allow using of electric power of the cartridge body, and a handle may be further provided on the cartridge body to increase a transporting convenience for a driver.

Advantageous Effects

According to the present disclosure, the structure for attachment/detachment of the energy pack for the electric vehicle has effects as follows.

First, the weight of the vehicle may be reduced by separating the high capacity energy pack, so the fuel efficiency may be increased.

In particular, the present disclosure has a configuration in which an additional battery is mounted inside the vehicle, so the storage space for mounting the additional battery is formed inside the vehicle, and the weight of the vehicle may be further reduced due to the storage space. Accordingly, the fuel efficiency may be further increased when the additional battery is in a state of being separated from the vehicle.

Second, since the energy pack for supplying additional energy is mounted inside the vehicle, the aesthetic sense of the exterior of the vehicle does not decrease.

Third, since there is no change in a driving environment even when the energy pack is mounted, there is no requirement for an additional driving skill.

That is, the structure of the present disclosure provides an advantage in which any general driver is capable of driving the vehicle.

Fourth, there is no need for an additional parking space, and there is no need for a parking skill.

Fifth, the structure of the present disclosure provides the leg and the wheel that are rotated on the energy pack, and the handle, so the convenience of transporting and moving the energy pack may be increased.

Further, an energy source of the energy pack may be autonomously used since the structure of the present disclosure is provided with the output port. Therefore, the use of the structure of the present disclosure may be variously provided.

BEST MODE

Prior to the description, it should be understood that the terms used in the specification and the appended claims should not be construed as limited to general and dictionary meanings, but interpreted on the basis of the meanings and concepts corresponding to technical aspects of the present disclosure on the basis of the principle that the inventor is allowed to define terms appropriately for the best explanation.

Hereinafter, a structure for attachment/detachment of an energy pack for an electric vehicle according to an exemplary embodiment of the present disclosure will be described with reference to FIGS. 2 to 6.

The structure for attachment/detachment of the energy pack for the electric vehicle reduces a capacity of a main energy source supplying device of the electric vehicle, and is provided with an additional battery pack so as to compensate for reduced capacity of an energy source.

In addition, since the additional energy pack may be attached to or detached from an inside of the electric vehicle, fuel efficiency may be increased by reducing weight of the electric vehicle, and aesthetic sense of an exterior of the electric vehicle and convenience of driving the electric vehicle may be maintained.

Figure 1:
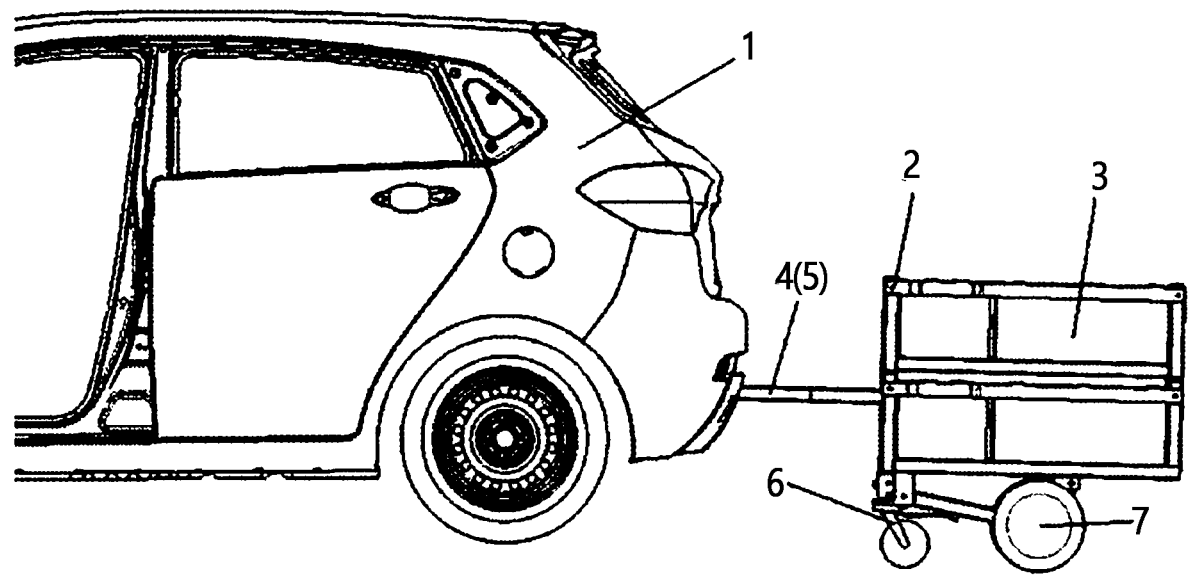
FIG. 1 is a side view of a main part illustrating a state in which an additional battery is towed to an electric vehicle according to the related art.
Figure 2:
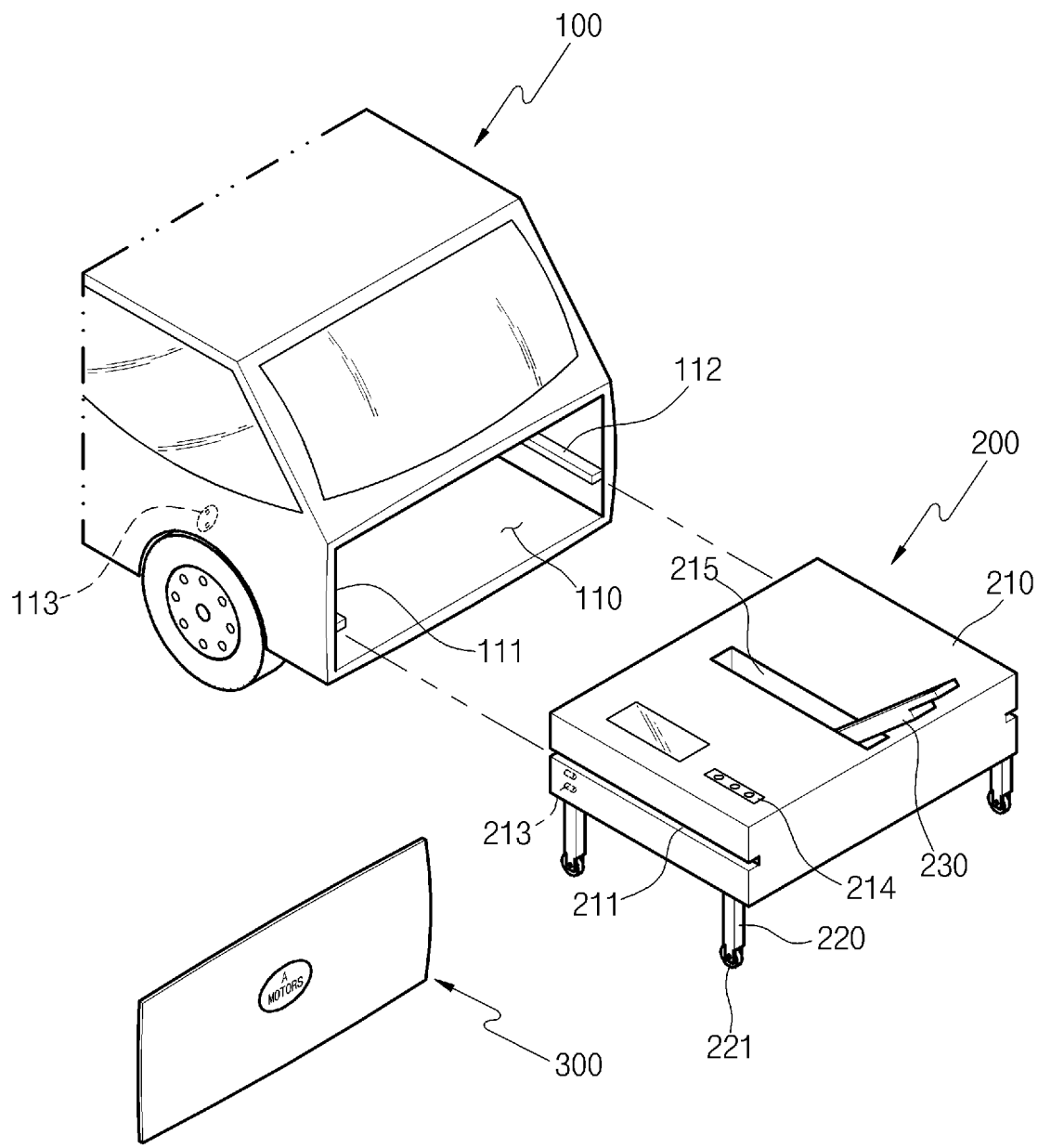
FIG. 2 is a perspective view illustrating a structure for attachment/detachment of an energy pack for an electric vehicle according to an exemplary embodiment of the present disclosure.

As illustrated in FIG. 2, the structure for attachment/detachment of the energy pack for the electric vehicle includes an electric vehicle 100, an energy pack 200, and a cover 300.

The electric vehicle 100 is an eco-friendly vehicle using electricity as a driving energy source, and includes a driving module (not illustrated).

In the electric vehicle 100, a main energy supply device (not illustrated) for driving the driving module is mounted as a basic component.

The main energy supply device is a device configured to generate electricity, and may be provided as a hydrogen fuel cell generating electrical energy by chemically reacting hydrogen, a rechargeable battery, or a device generating electricity by driving an engine using fossil fuel.

These main energy supply devices are well known technology.

At this time, it is preferable that the main energy supply device is provided with a relatively small energy capacity.

That is, by reducing the energy capacity, the main energy supply device is provided with a relatively small size.

At this time, it is preferable that the energy capacity of the main energy supply device has a capacity that is capable of driving a city commute distance.

Specifically, the energy capacity has a capacity of which the electric vehicle can be driven for an average of 50 to 60 km, and the energy capacity may be variable.

Since the size of the main energy supply device may be reduced in this manner, the weight of the vehicle may also be reduced, so that the fuel efficiency may be increased.

Meanwhile, as illustrated in FIG. 2, a storage space 110 in which the energy pack 200 may be stored is formed at a first side of the electric vehicle 100.

At this time, it is preferable that the storage space 110 is provided at a rear of the electric vehicle 100.

At a first side of the storage space 110, an entrance 111 through which the energy pack 200 that will be described later enters or exits is formed.

At this time, a guide protrusion 112 is respectively formed at opposite side surfaces of the storage space 110 from the entrance 111.

The guide protrusions 112 is configured to guide an entry and exit of the energy pack 200 from the storage space 110, and corresponds to a guide groove respectively formed on the energy pack 200 that will be described later.

At this time, positions of the guide protrusion 112 and the guide groove may be interchanged.

In addition, as illustrated in FIG. 2, electrodes 113 for contacting with the driving module are provided at a side wall of the storage space 110.

At this time, the side wall of the storage space 110 is preferable to be the most inner wall of the storage space 110.

The electrodes 113 are provided such that the electrodes 113 are electrically conducted to the driving module, and the driving module is supplied with an additional electrical energy through a contact point where the driving module is in contact with the energy pack 200 that will be described later.

Next, the energy pack 200 is a sub-energy source that provides the additional electrical energy to the driving module, and is configured to be attached to or detached from the storage space 110.

The energy pack 200 is provided in a size that corresponds to the storage space 110, and includes a cartridge body 210, a leg 220, and a handle 230.

The cartridge body 210 is an additional energy source that provides energy to the driving module, and may be provided in various types that are capable of generating electrical energy.

Figure 4A:
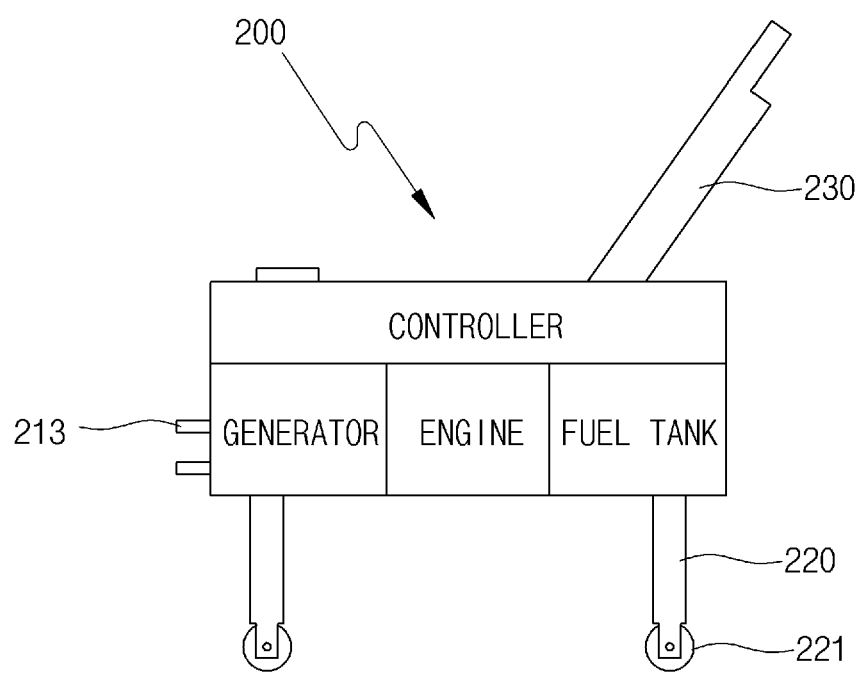
FIGS. 4A to 4C are views illustrating various examples of the battery pack according to an exemplary embodiment of the present disclosure.
Figure 4B:
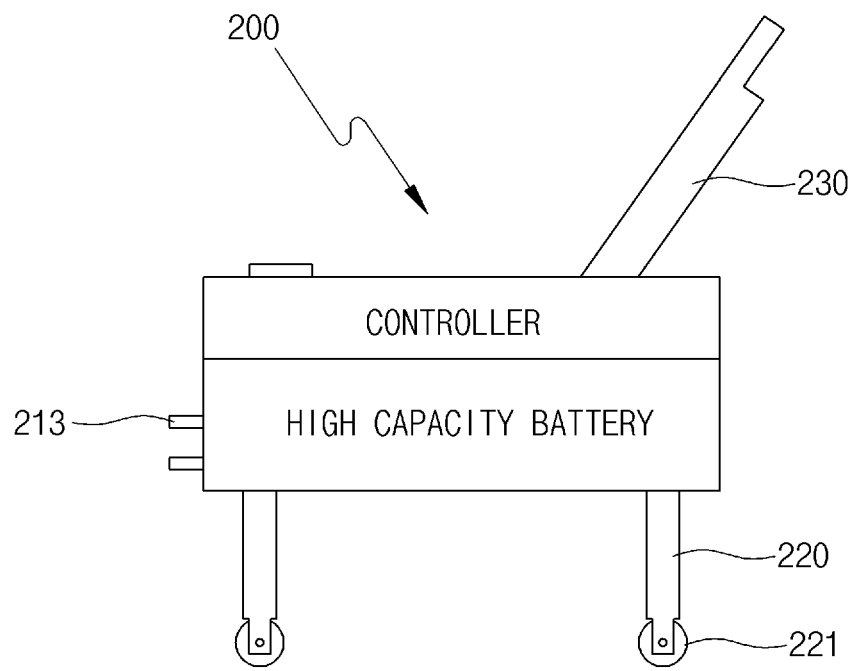
Figure 4C:
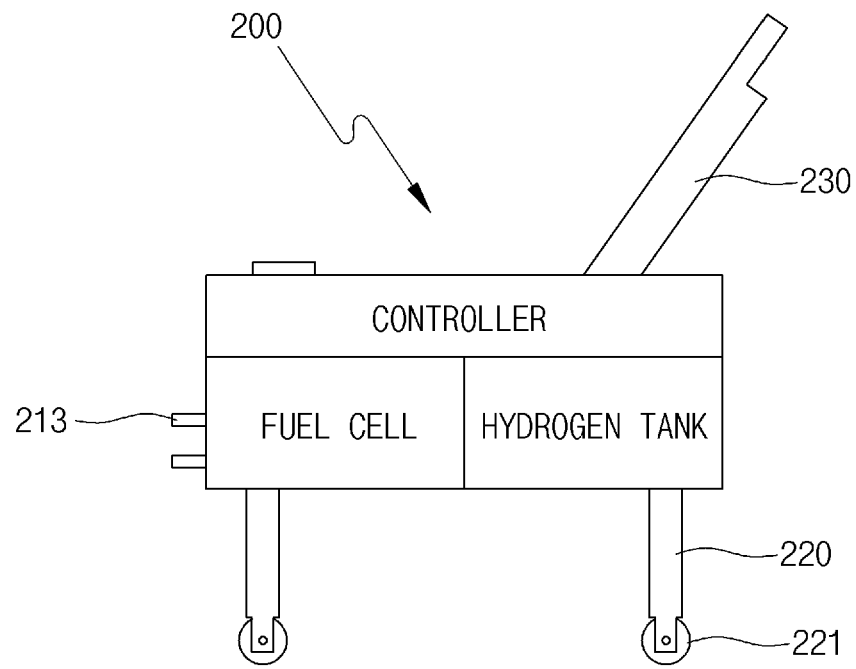

That is, as illustrated in FIGS. 4A to 4C, the cartridge body 210 may be provided to generate electricity through an engine power generation using fuel, may be provided as a high capacity electric battery, or may be provided such that electrical energy is generated through a chemical reaction of hydrogen.

At this time, it is preferable that an energy capacity of the cartridge body 210, which is an electrical capacity, is provided larger than the capacity of the main energy supply device.

For example, the energy capacity of the main energy supply device may be provided as 20% to 30% of the total energy capacity, and the energy capacity of the cartridge body 210 may be provided as 70% to 80% of the total energy capacity.

Accordingly, the cartridge body 210 is removed in a normal situation so that the fuel efficiency is increased by reducing the weight of the vehicle, and the cartridge body 210 is mounted in the vehicle when the vehicle is required to be driven in a long-distance, so that efficiency of driving the vehicle may be increased.

The cartridge body 210 is formed in a size that corresponds to the storage space 110, and is preferable to be formed in a rectangular shape.

On opposite side surfaces of the cartridge body 210, a guide groove 211 that corresponds to the guide protrusion 112 is respectively formed.

Figure 3:
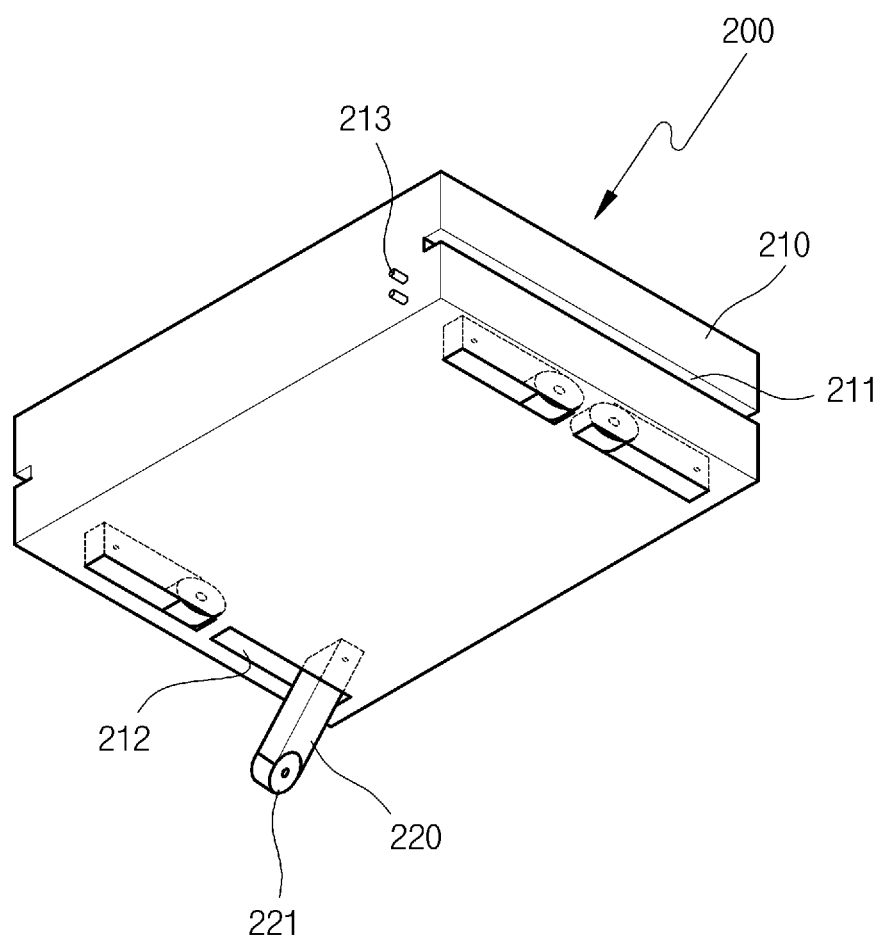
FIG. 3 is a bottom perspective view illustrating the energy pack of the electric vehicle according to an exemplary embodiment of the present disclosure.

As illustrated in FIG. 3, a leg groove 212 in which the leg 220 is capable of being accommodated is formed on a bottom surface of the cartridge body 210.

The number of leg grooves 212 corresponds to the number of legs 220 that will be described later.

The leg groove 212 is preferable to be formed at a position spaced inwardly from an end portion of the cartridge body 210.

Meanwhile, a supply terminal 213 is mounted at a first side surface of the cartridge body 210, and the supply terminal 213 corresponds to the electrodes 113 that are provided at the side wall of the storage space 110.

In addition, a controller 214 that is capable of controlling a current state of energy, a self-generation, and an energy supply is mounted on an upper portion of the cartridge body 210.

In addition, as illustrated in FIG. 2, a handle groove 215 is formed on the upper portion of the cartridge body 210.

The handle groove 215 is a space where the handle is mounted, and a size of the handle groove 215 corresponds to a size of the handle.

In addition, although not illustrated in drawings, an output port is further mounted at a first side of the cartridge body 210 such that the energy of the cartridge body 210 is used.

Types of the output port are not particularly limited, and may be designed and provided in various types.

The leg 220 serves to support the cartridge body 210 on the ground, and serves to allow a transportation and a movement of the cartridge body 210 to be performed conveniently.

The leg 220 is rotatably mounted at the bottom surface of the cartridge body 210. More specifically, the leg 220 is mounted such that the leg 220 is capable of being rotated on the leg groove 212.

It is preferable that a length (height) of the leg 220 is a length that is capable of allowing the guide protrusion 112 of the storage space 110 to be corresponded to the guide groove 211 of the cartridge body 210 when the leg 220 is supported on the ground.

By this configuration, when the leg 220 is unfolded toward the ground, the guide groove 211 of the cartridge body 210 corresponds to the guide protrusion 112, so that the cartridge body 210 may be easily stored into the storage space 110.

In addition, since the leg groove 212 is formed at a position spaced apart from the end portion of the cartridge body 210, a portion of the cartridge body 210 may be seated in the storage space 110 before the leg 220 is unfolded.

Meanwhile, a rotation structure of the leg 220 is not particularly limited.

Although not specifically illustrated, the leg 220 is mounted such that the leg 220 is freely rotated on the leg groove 212, and a locker (not illustrated) that is capable of restraining the rotation of the leg 220 may be mounted at a first side of the leg groove 212.

It is possible that a configuration of the locker may be applied with already known technology in which the rotation of the leg 220 is capable of being restrained or released.

In addition, apart from this, the leg 220 may be mounted such that the rotation of the leg 220 is electrically operated.

That is, on the leg groove 212, the leg 220 is mounted such that the leg 220 is capable of being electrically rotated, and the electric power comes from electricity of the energy pack 200.

A rolling means 221 is mounted at each leg 220 that has the configuration as described above.

The cartridge body 210 may be easily moved by a rolling action of the rolling means 221.

A wheel is preferable to be provided as the rolling means 221.

The handle 230 is provided for holding and handling of a driver so as to transport and move the cartridge body 210.

The handle 230 is rotatably mounted at the handle groove 215.

Next, the cover 300 serves to cover the energy pack 200 that is stored in the storage space 110, or serves to cover the storage space 110.

The cover 300 corresponds to the entrance 111 of the storage space 110, and is designed and provided as an extension line of the exterior of the vehicle.

Although not illustrated in drawings, the cover 300 is provided such that the cover 300 is capable of being attached to the electric vehicle 100 by using a restraining means.

The restraining means is not particularly limited, and it is possible to apply any configuration capable of attaching or detaching the cover 300 from the electric vehicle 100.

Hereinafter, an operation of the structure for attachment/detachment of the energy pack for the electric vehicle configured as described above will be described.

For a relatively short-distance driving such as commuting to work, the high capacity energy pack 200 having a heavy weight is separated from the vehicle.

To this end, in a state in which the cover 300 is separated from the vehicle, the energy pack 200 is pulled out and separated from the storage space 110.

At this time, as the guide groove 211 of the cartridge body 210 is guided by the guide protrusion 112, the energy pack 200 may be smoothly discharged.

At this time, the leg 220 at the first side discharged first from the storage space 110 is rotated by weight thereof, and is supported on the ground.

Then, the driver restrains the leg 220 at the first side by using the locker.

Figure 5:
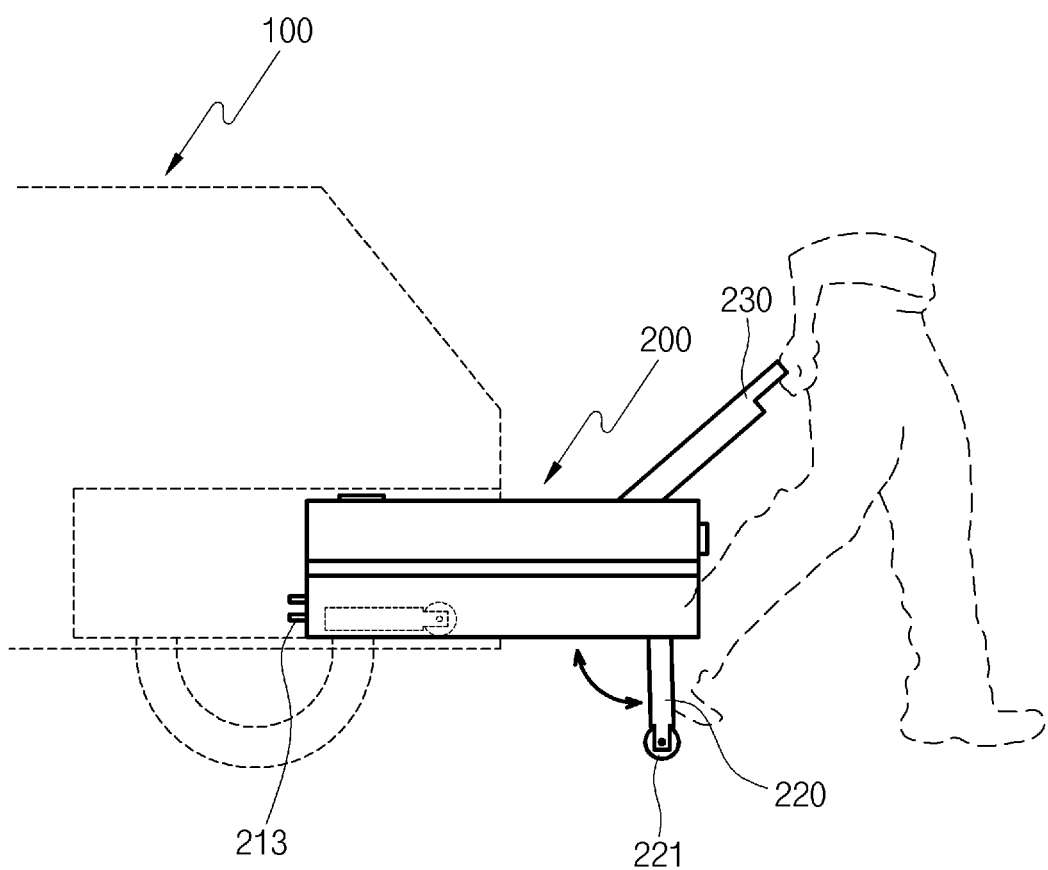
FIG. 5 is a view illustrating a state in which the battery pack is withdrawn from a storage space of the electric vehicle according to an exemplary embodiment of the present disclosure.

Then, the driver rotates the handle 230 so that the handle 230 protrudes upward from the handle groove 215, and moves the energy pack 200 as illustrated in FIG. 5.

Then, the energy pack 200 is moved by a guide action of the rolling means 221 and the guide groove 211, and the leg 220 at the second side is also rotated by weight thereof and is supported on the ground.

The driver also restrains the rotation of the leg 220 at the second side by using the locker, and moves the energy pack 200 to a separate storage place.

Next, the driver uses the cover 300 to cover the exposed storage space 110, and couples the cover 300 to the vehicle by using the restraining means.

In this manner, since the weight of the vehicle may be reduced by separating the high capacity energy pack 200 having the heavy weight from the vehicle, the fuel efficiency of the vehicle may be increased.

Specifically, as the fuel efficiency is more increased by the storage space 110, it is possible to perform the driving of the short distance even if the energy capacity of the main energy supply device is small.

Meanwhile, in this state, when the driving of the long distance is required, the energy pack 200 that was separated is mounted in the storage space 110.

To this end, the cover 300 is detached from the vehicle by releasing the restraining means.

Next, the energy pack 200 stored at the separate place is moved to the vehicle.

Then, when the energy pack 200 moves to the storage space 110 of the vehicle and a portion of the bottom surface of the cartridge body 210 is seated in the storage space 110, the guide groove 211 corresponds to the guide protrusion 112.

Then, although the driver releases the locker so that the rotation of the leg 220 is released from being restrained, the first side of the cartridge body 210 is supported on the storage space 110, and the second side of the cartridge body 210 is in a state of being supported on the ground by the other leg 220.

Figure 6:
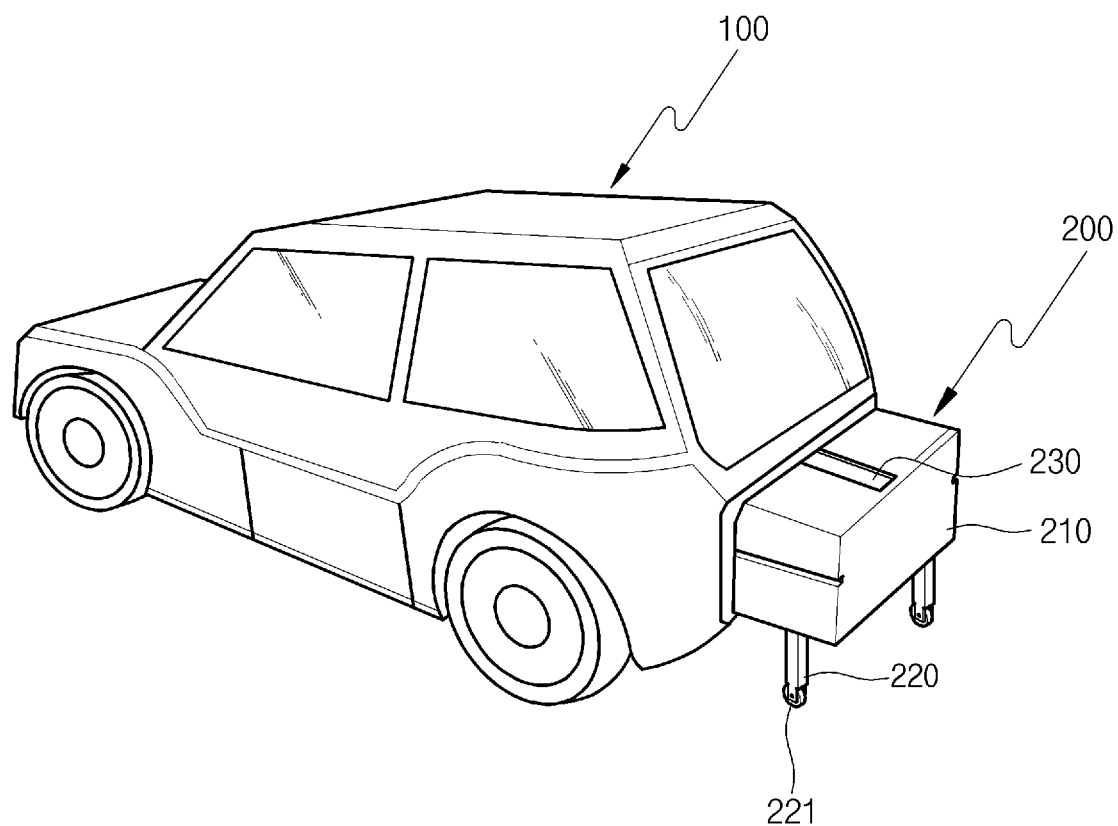
FIG. 6 is a view illustrating a state in which the energy pack is mounted in the storage space of the electric vehicle according to an exemplary embodiment of the present disclosure.

Then, as illustrated in FIG. 6, when the energy pack 200 is pushed into the storage space 110, the leg 220 is rotated while interfering with the storage space 110, and the leg 220 is accommodated in the leg groove 212.

Next, the handle 230 that was unfolded to perform the transportation is rotated to an original position thereof and is positioned in the handle groove 215.

Next, when the other leg 220 approaches the storage space 110 by pushing the cartridge body 210, the driver releases the locker and releases the rotation of the other leg 220 from being restrained, and the driver positions the other leg 220 to the other leg groove 212.

Then, by pushing the cartridge body 210 to the end of the storage space 110, the energy pack 200 is completely stored in the storage space 110.

At this time, the supply terminal 213 of the cartridge body 210 contacts the electrodes 113 of the storage space 110, and is ready to supply electricity.

Next, by coupling the cover 300 to the vehicle so as to cover the storage space 110, the energy pack 200 is completely mounted, and preparation for the driving of the long distance is completed.

Meanwhile, during a process of mounting the energy pack 200 into the storage space 110, a series of manual operations for rotating the leg 220 may reduce convenience, so that the rotation of the leg 220 may be performed by using electricity.

Figure 7:
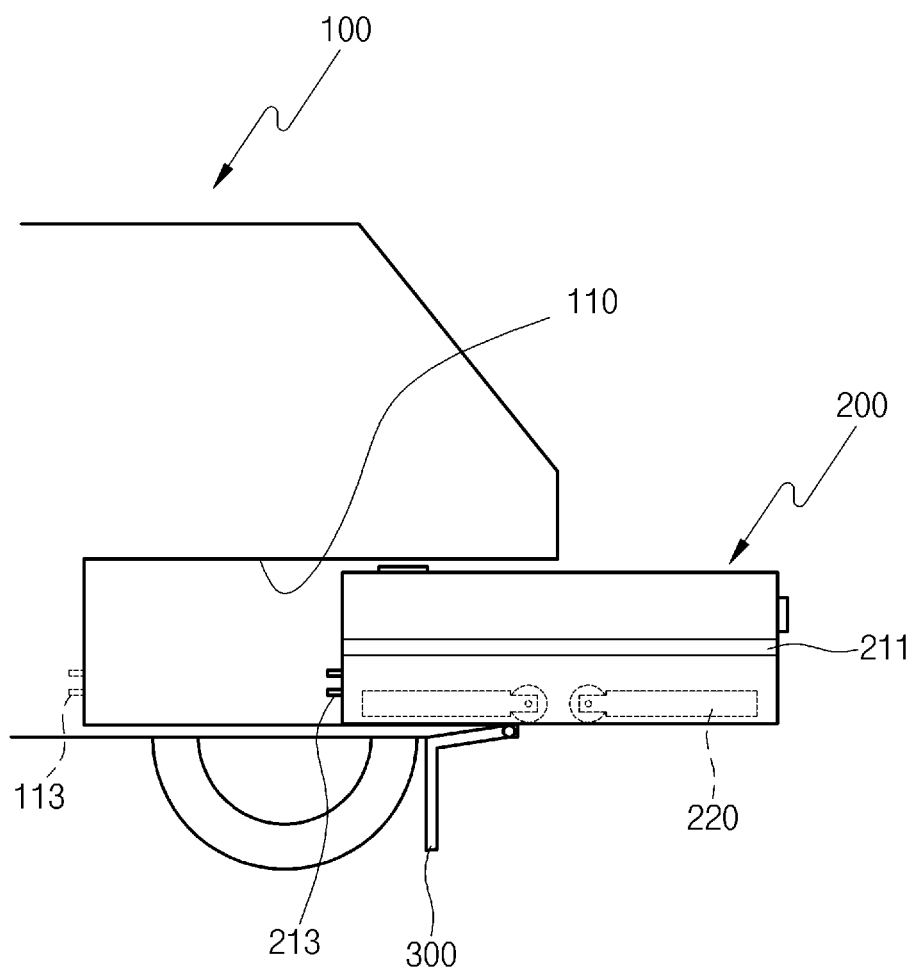
FIG. 7 is a side view illustrating the structure for attachment/detachment of the energy pack for the electric vehicle according to another embodiment of the present disclosure.

This is disclosed as another embodiment of the present disclosure, and will be described with reference to FIG. 7.

Prior to the description, the same reference numerals will be used throughout the drawings and the description to refer to the same or like elements or parts of the embodiment, and a detailed description thereof will be omitted.

The storage space 110 is formed at the rear of the vehicle, and the cover 300 is rotatably mounted at the rear of the vehicle.

In addition, the leg 220 is mounted such that the leg 220 is capable of being rotated with respect to the leg groove 212 of the cartridge body 210, and is provided on the leg groove 212 by a shaft so as to be rotated by electricity.

It is possible to apply the already known technology to the rotation structure of the leg 220 using electricity.

At this time, the rotation energy source of the leg 220 is provided such that the electric power of the cartridge body 210 is used.

Then, after the portion of the bottom surface of the cartridge body 210 is seated in the storage space 110 by moving the energy pack 200, then the guide protrusion 112 and the guide groove 211 are prepared to be in a state of being coupled to each other, and then the controller 214 is operated so that all of the legs 220 are rotated by using electricity.

After that, the cartridge body 210 is moved and stored into the storage space 110, and the energy pack 200 is completely mounted.

In this manner, since the leg 220 is automatically rotated by using electricity, the convenience of working of mounting the energy pack 200 into the storage space 110 may be increased.

As described above, according to the present disclosure, the structure for attachment/detachment of the energy pack for the electric vehicle reduces the weight of the vehicle body by reducing the weight of the main energy supply device through reducing the energy capacity of the main energy supply device, and mounts the energy pack that is a separate additional energy source into the vehicle so that the vehicle is provided with additional electrical energy.

As a result, the fuel efficiency of the electric vehicle may be increased. Further, since the energy pack is not exposed to an outside of the vehicle, the long distance driving may be performed without changing a driving environment.

The present disclosure has been described in detail with respect to the described embodiments. However, it is obvious to those skilled in the art that various modifications and changes may be derived within the scope of the technical spirit of the present disclosure, and it is natural that such modifications and changes belong to the appended claims.

DESCRIPTION OF REFERENCE NUMERALS

100: electric vehicle 110: storage space
111: entrance 112: guide protrusion
113: electrodes 200: energy pack
210: cartridge body 211: guide groove
212: leg groove 213: supply terminal
214: controller 215: handle groove
220: leg 221: rolling means (wheel)
230: handle

The invention claimed is:

1. A structure for attachment/detachment of an energy pack for an electric vehicle, the structure comprising:
   a storage space formed inside one side of the electric vehicle, having an entrance opened toward an outside of the electric vehicle, and provided with electrodes on a side wall of the storage space for supplying electric power to a driving module of the electric vehicle;
   a cartridge body included in the energy pack, entering or exiting the storage space through the entrance, and having a supply terminal configured to be in electric contact with the electrodes of the storage space; and
   a leg mounted on the cartridge body by a shaft and configured to be rotated toward the cartridge body and the ground, a rotation of the leg being performed by electric power of the cartridge body,
   wherein the energy pack is provided as a sub-energy source for supplying additional energy to the driving module of the electric vehicle, in which a main energy supply device is mounted to provide electric power to the driving module of the electric vehicle, and
   wherein an energy capacity of the cartridge body is greater than that of the main energy supply device.

2. The structure of claim 1, wherein a guide protrusion is formed on either one of opposite side surfaces of the cartridge body or inner side surfaces of the storage space, and a guide groove for guiding the guide protrusion is formed on the other one.

3. The structure of claim 2, wherein the leg has such a length that a position of the guide protrusion and a position of the guide groove match each other.

4. The structure of claim 1, wherein the leg is configured to be freely rotated, and a leg groove for accommodating the leg is formed on a bottom side of the cartridge body.

5. The structure of claim 1, wherein an output port is provided on the cartridge body to allow using of electric power of the cartridge body, and a handle is further provided on the cartridge body to increase a transporting convenience for a driver.

6. The structure of claim 2, wherein the leg is configured to be freely rotated, and a leg groove for accommodating the leg is formed on a bottom side of the cartridge body.

7. The structure of claim 2, wherein an output port is provided on the cartridge body to allow using of electric power of the cartridge body, and a handle is further provided on the cartridge body to increase a transporting convenience for a driver.

8. The structure of claim 3, wherein the leg is configured to be freely rotated, and a leg groove for accommodating the leg is formed on a bottom side of the cartridge body.

9. The structure of claim 3, wherein an output port is provided on the cartridge body to allow using of electric power of the cartridge body, and a handle is further provided on the cartridge body to increase a transporting convenience for a driver.

* * * * *